United States Patent
Alexander

(10) Patent No.: US 9,709,465 B2
(45) Date of Patent: Jul. 18, 2017

(54) PUMP TESTING SYSTEM

(71) Applicant: Dale Alexander, Granbury, TX (US)

(72) Inventor: Dale Alexander, Granbury, TX (US)

( * ) Notice: Subject to any disclaimer, the term of this patent is extended or adjusted under 35 U.S.C. 154(b) by 130 days.

(21) Appl. No.: 14/507,774

(22) Filed: Oct. 6, 2014

(65) Prior Publication Data

US 2016/0097397 A1  Apr. 7, 2016

(51) Int. Cl.
*G01M 99/00* (2011.01)
*F04D 15/00* (2006.01)
*A62C 37/50* (2006.01)

(52) U.S. Cl.
CPC ............ *G01M 99/00* (2013.01); *A62C 37/50* (2013.01); *F04D 15/0088* (2013.01); *F05D 2260/12* (2013.01)

(58) Field of Classification Search
USPC .......................................................... 73/168
See application file for complete search history.

(56) References Cited

U.S. PATENT DOCUMENTS

| 2008/0060706 | A1* | 3/2008 | Combs ................ A62C 35/68 137/556 |
| 2009/0255331 | A1* | 10/2009 | Weis ................ F04D 15/0088 73/168 |
| 2011/0196624 | A1* | 8/2011 | Hackett, III ............ G01F 1/667 702/45 |

FOREIGN PATENT DOCUMENTS

CN   201351736 Y  * 11/2009  ............. F16K 37/00

* cited by examiner

*Primary Examiner* — Michael A Lyons
*Assistant Examiner* — Jean Morello
(74) *Attorney, Agent, or Firm* — Warren V. Norred; Norred Law, PLLC

(57) ABSTRACT

The invention is a pump testing system that allows users to test centrifugal pumps by the use of an artificially controlled load, measure flow of the pump under controlled operating parameters, and ensure that the pump meets industry standards of operation. The specific embodiment disclosed herein concerns centrifugal pumps used in fire fighting vehicles, but is not limited to such apparatus.

13 Claims, 3 Drawing Sheets

PUMP TESTING SYSTEM

TECHNICAL FIELD OF THE INVENTION

The field of the invention concerns flow test capability of centrifugal pumps, particularly those used in fire fighting apparatus.

BACKGROUND OF THE INVENTION

Automotive fire apparatus (often referred to as "fire trucks" or "fire engines") typically include a centrifugal pump that provides the water pressure to fire hoses for fire fighters while they attempt to eliminate fires.

Because these pumps are so critical to the fire-fighting effort, this equipment must be maintained properly.

The National Fire Protection Association (NFPA) has promulgated standards for the inspection, maintenance, testing, and retirement of in-service automotive fire apparatus since at least as far back as 1987.

Beginning in 1991, the NFPA began issuing standards which were more proactive than in previous years. For example, the 1991 standards specified that 3" or larger valves be tested at 500 psi, that intake relief valves be used to manage incoming pressure, that 30-degree sweep elbows be provided on the discharges to eliminate hose kinking, and that all three-inch and larger discharges be eliminated from the pump panel to reduce the possibility of injuries to pump operators.

The NFPA's most recently released standard is entitled "NFPA 1911: Standard for the Inspection, Maintenance, Testing, and Retirement of In-Service Automotive Fire Apparatus, 2012 Edition" ("NFPA 1911") which is incorporated herein in full.

This latest standard includes a long list of checks and tests by which operators of fire engines can ensure that their apparatus are kept in proper working order. These tests are to be conducted at least annually, or when any substantial repair or modification is made.

One of the important tests conducted concerns the strength and proper operation of the pumps on the apparatus. This test, known colloquially as the "Draft Test", tests the ability of a pump to pull water from a source below the apparatus and provide a source of pressurized water for fire fighters.

The Draft Test can be difficult to perform, as the apparatus should be parked near a water source, and positioned such that the vertical distance between the water source and pump intake is defined in the test (usually ten feet), based on the pump capacity. (See NFPA 1911, Chapter 18.)

Alternatively, the test can be conducted from a hydrant, but the test can easily use more than 50,000 gallons, which can impact municipal water sources. The tester must take the hydrant pressure into account. Finally, use of municipal water means that operators must plan for the discharge of the considerable amount of water, which can be alarming to those nearby. For these reasons, use of municipal water hydrants is disfavored by those who conduct these tests.

To move the apparatus to a testing area inherently means that a unit is out of service longer than it would be in comparison to a test that could be conducted at a fire station.

Test operations require flow measurements using pitot tubes accurate to 5%, constant monitoring to prevent nozzle movement. Instruments measuring pressure must meet ASME B40.100 (Pressure Gauges and Gauge Attachments), which the inventor herein incorporates. This standard requires test gauges to be at least 3.5" and a range of 30 in. Hg (100 kPa) vacuum to zero for a vacuum gauge (or 30 in. to 150 psi for a compound gauge).

Because a typical test in the current art requires use of a pitot gauge to get an accurate reading, the discharge water stream is positioned so the water flows into the discharge water tank from above the surface of the water. The churn of the discharge water aerates the water. If the system in use is a closed-cycle, the aerated water can hide a vacuum leak in the pump. Eliminating air in the resource/recovery tank would be beneficial for that purpose.

These tests include many other requirements, such as measurement of engine speed within 50 rpm during the tests, the ambient air temperature, water temperature, elevation of the test site, and atmospheric pressure, must all be recorded before and after the pump testing.

All these instruments must be calibrated within 60 days preceding the tests, and as the standard changes, fire station personnel must make changes to reflect those standards.

If a pump will be tested from draft (directly from a water source), the pump must be "primed" by use of a positive displacement pump or a air priming system which lowers atmospheric pressure within the pump allowing water to pushed into the from a higher outside atmospheric pressure.

Because of the foregoing reasons and other requirements included in NFPA 1911 and ASME B40.100, fire departments continue to seek better ways to test the centrifugal pumps on their apparatus without sacrificing the quality of a true draft test. This statement holds true for any industry searching for a more efficient and accurate flow test. Those who are seeking these flow tests need a system that performs with such efficiency that there is no excessive down time, keeping their instruments calibrated, conducting their test without impacting the municipal water supplies, and without concerning themselves with discharged water runoff.

SUMMARY OF THE INVENTION

The present invention is a Pump Testing System that is fully independent, mobile, includes its own water supply, water recovery, calibrated instrumentation, data collection, trending of data, device control program (PLC logic), wireless network, system database, cloud based retention and report delivery system, laptop (which contains the HMI—Human Machine Interface program) and water pump work load capable of creating a Draft Test with a controlled intake work load.

As currently configured, the system comes as a fifth-wheel trailer that uses butterfly valves which control the flow resistance of the intake water supply to the centrifugal pump, creating an infinite amount of intake work load without the restraints of topography, access to a drafting location, and has minimal environmental impact. By closing or opening the valve, the intake work load can be increased or decreased, respectively, without changing plumbing or suction hoses length or size (one size can fit all).

Water discharged from the pump is recycled back into a recovery tank, also located on the trailer.

Other features and advantages of the present disclosure will be apparent to those of ordinary skill in the art upon reference to the following detailed description.

DETAILED DESCRIPTION OF THE INVENTION

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of the presently-described systems and methods. The specific embodiments discussed herein are, however, merely illustrative of specific ways to make and use the disclosure and do not limit the scope of the disclosure.

DETAILED DESCRIPTION OF THE INVENTION

Figure 1:
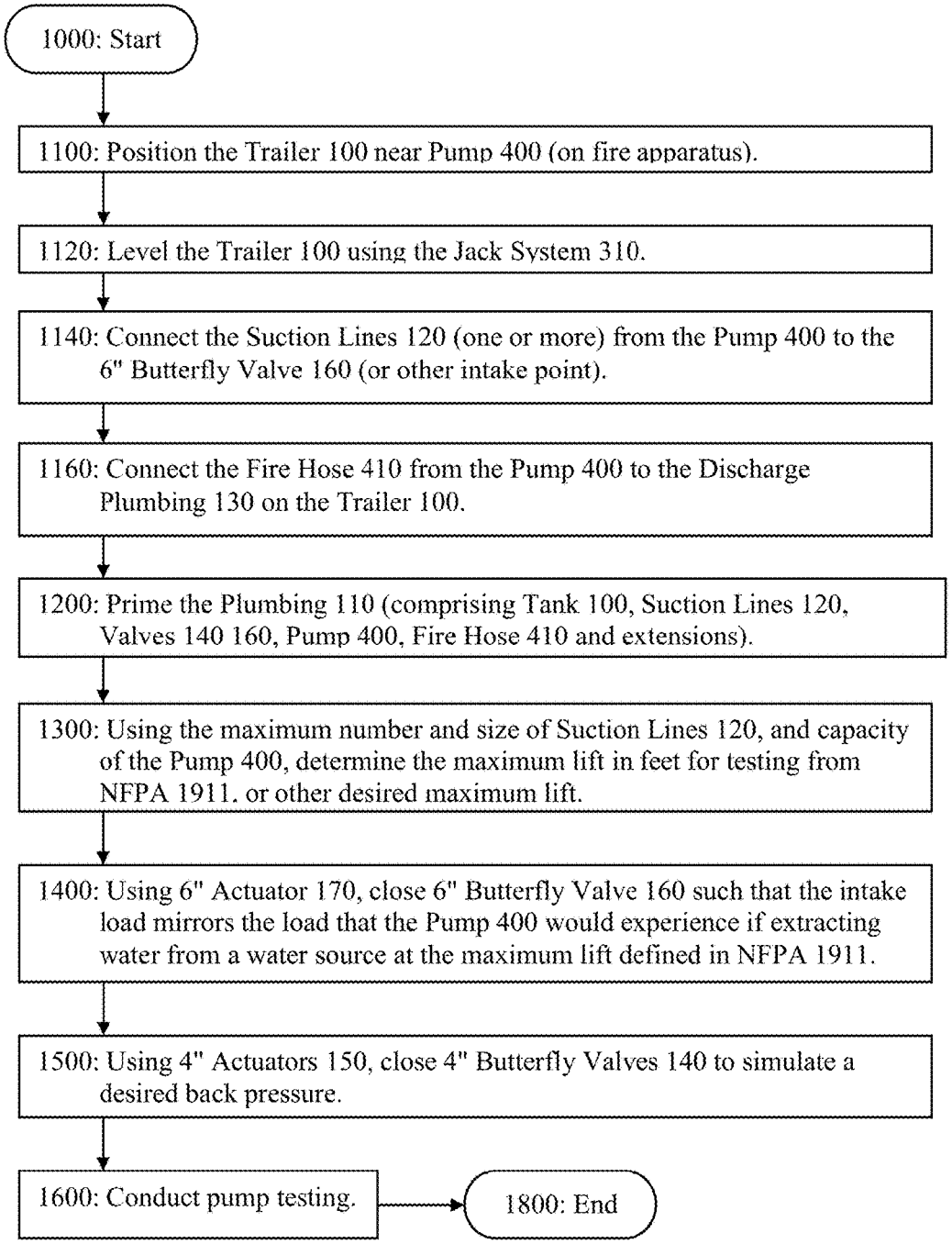
FIG. 1 is a flow chart of the invention's operation.
Figure 2:
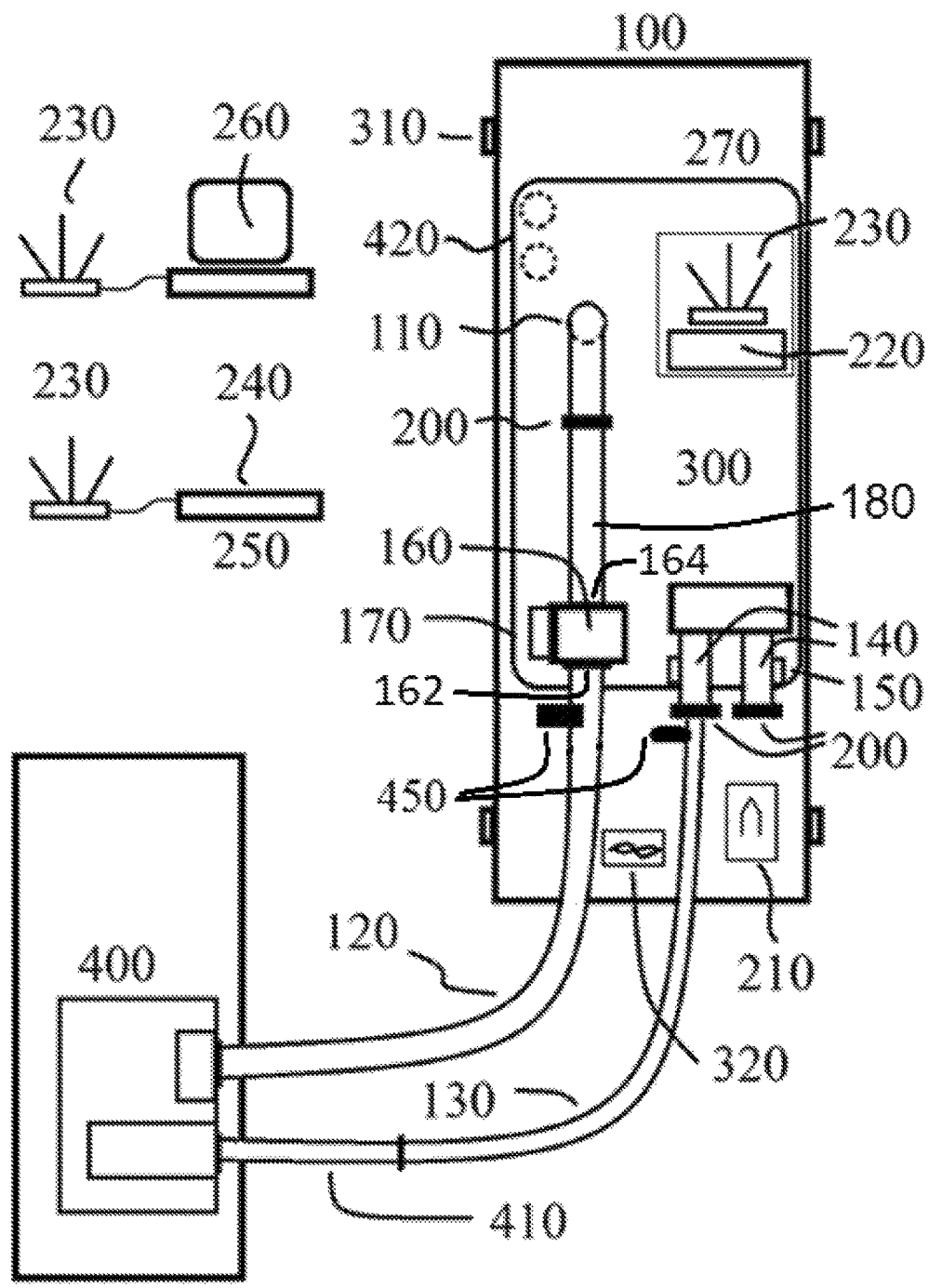
FIG. 2 is a pictorial representation of the invention's components and their interaction.

This pump testing system eliminates the need for a fire apparatus vehicles to leave their operating station, eliminates the need to use municipal water or be concerned about pump water discharge, or for individual fire fighting organizations to maintain calibrated instruments.

The embodiment of the invention described herein includes the following components:

Trailer 100—As currently embodied a fifth-wheel trailer. All the components fit on the Trailer, including the Tank 300, Jack System 310, the Butterfly Valves 140 160 and their attached Actuators 150 170, the various hoses, Flow Meters 200, the Electrical Control Box 270, and all other parts necessary to use the invention. The Trailer 100 as used is fully enclosed for security purposes and to keep from direct sunlight, though the invention does not require full enclosure. The invention could be mounted on skids and permanently fixed to a location.

Plumbing 110—Describes the path through which pumped water travels during the Draft Test, typically comprising the Tank 300, 6" piping 180, Flow Meters 200, 6" Butterfly Valves 160 (which includes a first port 162 and a second port 164), 4" Butterfly Valves 140, Suction Lines 120, Pump 400, Fire Hose 410, and Discharge Plumbing. Other elements might be part of this path, including test instruments such as thermocouples or flow meters.

Suction Lines 120—In typical use, a Pump 400 receives its water from a nearby source, either a fire hydrant or open water through the Suction Lines. The position and length of these lines are important for accurate pump testing pursuant to NFPA 1911 because water being pulled through the Suction Lines create resistance on the intake side of a pump; if the Suction Lines extend too far down to the water, the pump may not receive adequate water to reach required flow. In this invention, the Suction Lines are attached to the 6" Butterfly Valve 160. However, the Suction Lines need not be directly connected to the Pump 400, as long as the operator takes the additional pump load into account when adjusting the load on the Pump 400 with the positioning of the Butterfly Valve 160.

Pump Discharge Plumbing 130—comprises that portion of the plumbing through which the Pump 400 discharges water, and includes the Fire Hose 410, any extension thereto, the 4" Butterfly Valve 140, and Tank 100 (receiving side). The invention as embodied in this application has two 4" Butterfly Valves 140, each with two discharge pipes back to the receiving portion of the Tank 300, each with separate Flow Meters 200. The discharge pipes empty below the surface of the water in the Tank 300, preventing problematic aeration. In the current embodiment, the pipes discharge 18-24" below the surface. By injecting the water below the surface, the water is much less likely to be aerated than in prior art systems in which discharged water enters from above the water surface and is naturally aerated by the violent entrance into the mass of water. This change allows a user to observe vacuum leaks on the intake side of a pump by looking for bubbles.

4" Butterfly Valve(s) 140—One or more valves powered by 4" Actuators 150 that, as they close to create a desired back pressure. As configured, the Fire Hose 410 (and any necessary extension) connect and feed to the "input" side of each Valve 140, and internal piping to the Tank 100 on a receiving side).

4" Actuator(s) 150—A user can control the 4" Butterfly Valve 140 by these actuators, through a Programmable Logic Control 220 in an Electrical Control Box 270. In the current embodiment, the entire system is operated via a wireless LAN and controlled through a Laptop 260, but the system could be fully wired.

6" Butterfly Valve(s) 160—This valve is mounted on the Trailer 100. On one side, it connects to the Suction Line 120 leading to the Pump 400. The other side connects to the Tank 300. Between the Valve 160 and the Tank 300 is a Flow Meter 200. The Valve 160 is controlled by a matching 6" Actuator 170.

6" Actuator 170—A user can control the 6" Butterfly Valve 160 by the 6" Actuator 170, through a Programmable Logic Control 220 in an Electrical Control Box 270. In the current embodiment, the entire system is operated via a wireless LAN and controlled through a Laptop 260, but the system could be fully wired.

Flow Meters 200—Flow meters are used to measure flow through and along the water pathways. One is set along the piping with the 6" Butterfly Valve 160, and others in the Discharge Plumbing 130, each 4" Butterfly Valve 140 in line with its own Flow Meter 200.

Thermocouple Probe(s) 210—Probes 210 are used to monitor the ambient air and water temperature. The current embodiment of the invention monitors the temperature of the water as it enters the receiving end of the tank.

Programmable Logic Controller (PLC) 220—The PLC 220 does several tasks. The PLC receives commands from the HMI (Human Machine Interface) program on the laptop wirelessly to the PLC to control the actuating devices through ladder logic programming. The PLC also receives raw data from the other devices, such as the flow meters and thermocouple. The PLC converts the raw data to analog data to be read by the HMI program contained on the laptop that in turn converts it to real data which can be read out as numbers or evaluated to discern trends.

LAN Network 230—Though all of the components in the invention can be hard-wired, the invention as embodied uses a LAN Network 230 installed in the Electrical Control Box 270 to communicate with the Laptop 260.

Wireless Data Logger 240—This device is connected directly to the onboard apparatus computer that monitors many parameters, such as the engine RPM, temp and oil pressure. As currently configured, the data logger has its own self-contained Bluetooth system that allows it to wirelessly connect to the laptop where the program receives raw data from the logger and converts it to real numbers. The HMI can detect and reports trends through any number of reporting methods, such as a dial gauge or time-based graph, or any other desired format.

VNC Interface Program 250—Though the entire system could be controlled directly, the invention uses an application installed on a smart phone or tablet to provide screen monitoring and control of the Laptop 260, which then communicates with the rest of the invention to control the Actuators 150 170 to position the Butterfly Valves 140 160, and monitor resulting flow rates using the Flow Meters 200.

Laptop 260—Though no programmable computing device is critical to the invention, a laptop is used in the current embodiment to control the system in an automated fashion, monitor the results reported from the PLC, and communicate with a smart phone or other portable device using commercially available interface software (currently VNC, available from RealVNC™, located at www.realvnc.com). Use of software in this manner allows nearly instantaneous reaction to a negative trend or a sudden malfunction.

Electrical Control Box 270—The invention currently includes this NEMA 250 Standard Type 4X electrical enclosure, in which all of the electronics are installed, including but not limited to a power supply, PLC, or Wireless Data Network 230.

Tank 300—The invention as embodied uses a large water Tank 300 installed on the Trailer 100. The Tank 300 supplies water through 6" piping that runs across the top of the tank to the flow meter then through the 6" butterfly valve then to the suction line then onto the pump. It also receives water from the Pump 400 through the Fire Hose 410 and Discharge Plumbing 130, including the 4" Butterfly Valves 140. The Tank 300 as embodied includes Overflow Drains 420 in the Tank 300 to allow discharge from the Pump if the Tank fills and cannot accept additional water. As currently embodied, the tank contains a baffling system that slows the turbulence and eliminates whirl pooling at the vertical suction piping inside the Tank 300.

Jack System 310—The invention as embodied includes a hydraulic lifting system capable of supporting 48,000 pounds, and must be used to support the Tank 300, and keep it level.

Exhaust Fan 320—This fan is powered from an electrical outlet that is switched inside the office space. It assists to ventilate the warm humid air to the back opening of the trailer and to keep the electronics at an operating temperature inside the Trailer 100.

Pump 400—The Pump 400 is not part of the invention, but is the subject of the invention, as the invention supplies the Pump 400 with water at a controlled intake load and flow, and also accepts Pump 400 discharge at a controlled backpressure.

Fire Hose 410—The Fire Hose 410 is also typically part of the equipment that comes on a pump-equipped fire truck, and carries Pump 400 discharge to the Tank 300 and associated Plumbing 110.

Overflow Drain 420—These drains as currently embodied are two 4" tubes plumbed thru the bottom of the Tank 300 and floor of the Trailer 100 that discharges water onto the ground when the Tank 100 is filled.

Smartphone 430—As currently embodied, the invention uses VNC, a software program commercially available from RealVNC at http://www.realvnc.com, to control the system wirelessly using a mobile computing device such as a smart phone or tablet to communicate with the Laptop 260.

As described above, the Pump 400 and Fire Hose 410 are part of the fire apparatus to be tested, as pre-existing parts of a vehicle fire apparatus, as the invention is a mobile test facility useful for testing of any liquid-based pump.

As shown in FIG. 1, the invention is employed using the following steps that follow. Some of these steps are optional, but included for completeness.

Step 1100—The Trailer 100 is placed near the fire engine with a Pump 400 to be tested.

Step 1120—Using the Jack System 310 or other supporting structure, ensure that the invention is level, supported and fixed in place.

Step 1140—According to the test procedure outlined in NFPA 1911, a fire engine's Suction Lines 120 is lowered into water, typically two to three meters below the Pump intake. When using this procedure and invention, these Suction Lines 120 are connected between the Pump 400 and intake piping that contains the 6" Butterfly Valve 160, the Valve leading to the Tank 300 through a Flow Meter 200, so that in operation, water is pulled from the Tank 300, is measured by the Flow Meter 200, with a controlled resistance intake work load caused by the partial closure of the 6" Butterfly Valve 160.

Step 1160—The user connects the Fire Hose 410 between the Pump 400 and Discharge Plumbing 130. The Discharge Plumbing 130 includes one or more 4" Ball Valves 140, controlled by 4" Actuator 150, and Flow Meter 200.

Step 1200—In this step, the user follows the already established priming technique to ensure water is present throughout the plumbing. This may be accomplished by simply turning the pump on, or by some manual means of adding water to the plumbing. In either case, it is assumed that this step is part of the known process that users already follow while performing this test procedure.

Step 1300—Users can find the maximum test lift in NFPA 1911, based on the number and size of Suction Lines, and capacity of the Pump 400. This test lift is typically ten feet for low capacity pumps, and six feet for higher capacity pumps.

Step 1400—When users are testing pumps using a natural water source, a pump must pull water up from the source. This work load is created by the pump having to overcome gravity and is what is known as an "intake work load". The amount of the intake work load is measured in vacuum (mmhg) 0-30 inches. In the prior art, gravity is used to create intake work load. Under a higher intake vacuum, the pump must work harder to pull water into its intake. Because a pump has a limited amount of power to pull water through it, a pump working harder to pull water into its intake will necessarily have less flow available for the discharge side. Reducing intake load can result in a greater pump flow than the pump's rating.

In this invention, the pump must still lift water 12"-16". The additional intake work load desired is accomplished with a 6" Butterfly Valve 160 that is positioned by use of 6" Actuator 170 to close or open the Valve 160 to replicate the intake work load. During this time and going forward, Flow Meter 200 continuously measures the flow within the Suction Lines 120, feeds it to the PLC via wire.

Step 1500—Similarly to the previous step, the 4" Butterfly Valves 140 are used to create a desired back pressure in the Discharge Plumbing 130. The flow is monitored during this time by the Flow Meter 200 in the same line on the discharge side.

Step 1600—Once the Butterfly Valves 140 160 have been set to create the intake and back pressure loads on the Pump 400 that would be experienced during a Draft Test of a pump near a water source as provided in Chapter 18 of the NFPA 1911, the Pump 400 may be tested, along with all the other apparatus test procedures.

Figure 3:
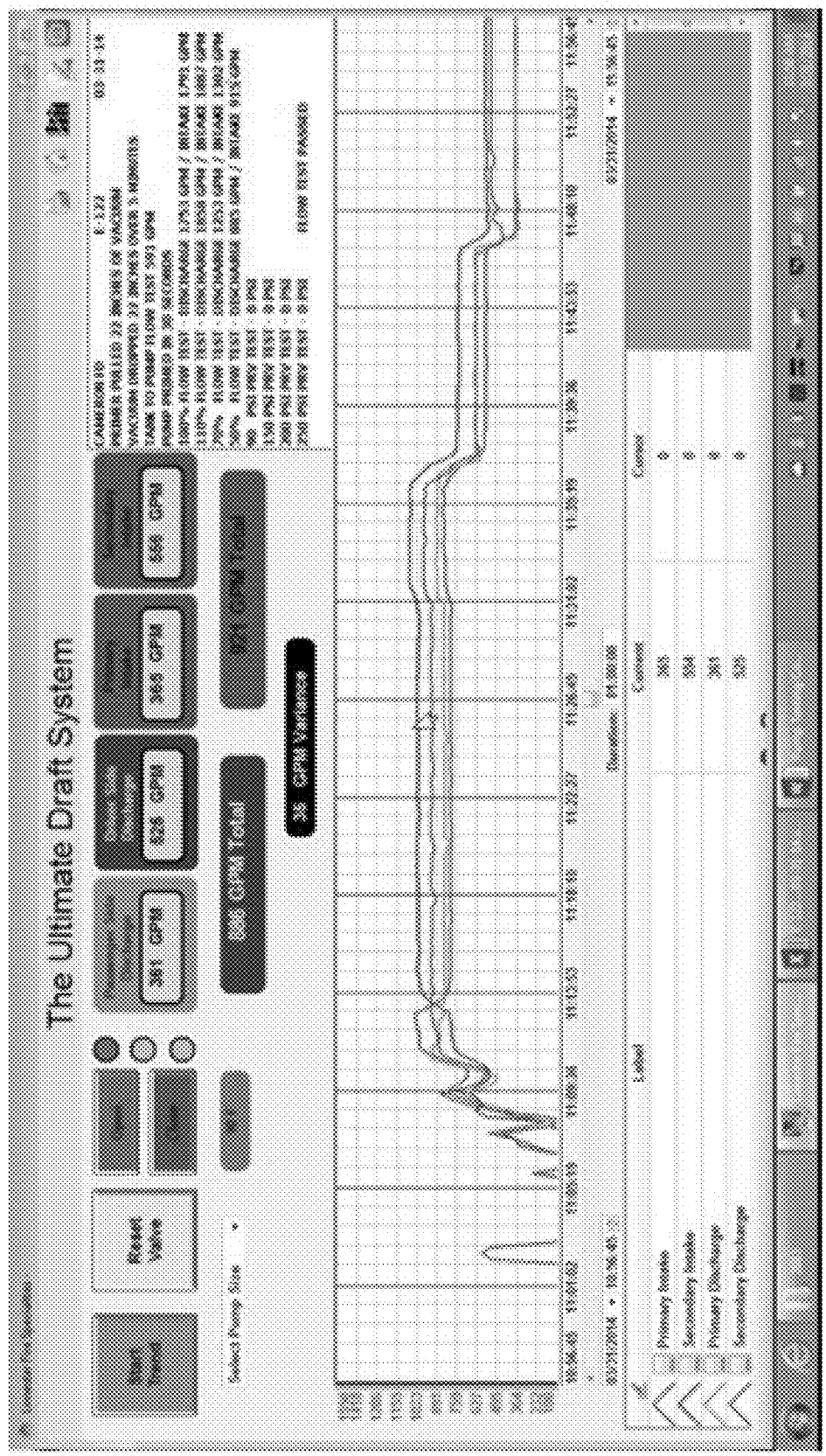
FIG. 3 is a sample interface screen showing test results while using the invention.

As shown in FIG. 3, the Laptop accumulates the data sent to it from the PLC via Wireless LAN and displays it in a manner that is easy to monitor and see the results over time.

While the invention has been illustrated and described in details in the drawings and foregoing description, the same is to be considered as illustrative and not restrictive in character, it being understood that only certain embodiments have been shown and described and that all equivalents, changes, and modifications that come within the spirit of the inventions as described herein and by the following claims are desired to be protected. For example, the Tank 300 can be used only to receive discharged water from the Pump 400, with a hydrant used as a water supply feeding through a Flow Meter 200 and 6" Butterfly Valve 160 to create the same input to the Pump 400.

All of the instrumentation could be wired directly to a PLC that is in turn wired to a desktop computer, instead of using the LAN 230 and Laptop 260.

One of the significant developments of this invention is the ability to create the draft test conditions by closing the 6" Butterfly Valve 160 to create the intake work load experienced by the Pump 400, and the 4" Butterfly Valve(s) 140 to create the backpressure to the Pump 400.

The Butterfly Valve 160 is closed manually or by electronic control to generate the desired intake load (vacuum setting). Optional Vacuum Transducers 450 could be added to the system and used as a feedback signal to the control software to account for unexpected conditions.

Best use of the system would compare repeated annual testing to detect variations in performance base on a first test baseline. In recreating the annual test, the vacuum side of the pump is much more important than the backpressure created on the discharge side, which is used to keep the discharge pressure at the end of our discharge piping at as low of a pressure as possible without sacrificing hose chatter at the pump connection (caused by insufficient backpressure). In these recreated tests, the Valve 160 positions can be predetermined and have minimal impact even if they fluctuate 10-20 PSI from pump to pump.

In the current embodiment, the software on the Laptop has a drop down box from which the user selects the pump size to be tested. The selection of the pump size determines which ladder of logic the PLC uses to control the valves. The software allows testing backpressure to be set by a touch button, each of which closes the Valve 160 to close a predetermined length of time to accomplish a range of backpressure, at about 100%, 70% and 50% of a target. In the existing art, testing methods using pitot tubes require a stop water flow to change the tip size on the piping, causing a loss of testing time and substantially more labor.

The inventor claims:

1. A Pump Testing System, comprising:
   a. a first two-port valve, capable of incremental movement and positioning between its fully open and fully closed positions, sized for attachment to a fire fighting apparatus pump's suction hose on a first port, capable of attachment to a tube on the second port, and opened to a position which simulates the intake work load to the apparatus pump under industry standard draft test condition
   b. the tube capable of connection to the two-port valve on one end of the tube, and the other end attached to a source of water, the tube also capable of carrying sufficient water flow to test the fire fighting apparatus pump;
   c. a water storage tank with a portal that is constructed to serve as the source of water;
   d. a second port in the water storage tank that can connect to the discharge of a fire hose such that the pump discharges into the tank below the surface of the water in the tank;
   e. a flow meter which measures water flow through the tube before the water leaves the tube.

2. A Pump Testing System as in claim 1, further comprising an electronic actuator controlling the position of the two-port valve.

3. A Pump Testing System as in claim 2, further comprising a Programmable Logic Device (PLD) that controls the actuator based on set instructions or additional external input.

4. A Pump Testing System as in claim 1 in which the flow meter does not include a pitot tube.

5. A Pump Testing System as in claim 3, further comprising at least one Thermocouple which provides data to the PLD.

6. A Pump Testing System as in claim 3, further comprising a Wireless Local Area Network that allows any unwired sensors or electronic equipment to communicate.

7. A Pump Testing System as in claim 3, further comprising a Computer programmed with software to display and save operational parameters, including but not limited to, flow meter measurements and temperature measurements.

8. A Pump Testing System as in claim 7, further comprising a handheld mobile computing device programmed such that it can communicate with the Computer and control the Pump Testing System.

9. A Pump Testing System as in claim 3, further comprising a computing device which is in communication with the PLD, which can accept sensor data from the PLD, and can communicate additional instructions to the PLD such that the actuator can reposition the valve to change the intake work load to the Pump.

10. A Pump Testing System as in claim 3, further comprising a data logger which stores data from the PLD.

11. A Pump Testing System as in claim 3, further comprising a second two-port valve, capable of incremental movement and positioning between its fully open and fully closed positions, sized for attachment to the discharge end of a fire hose on a first port, and opened to a position which simulates the backpressure that the pump would experience when the pump might be employed to extinguish a fire.

12. A method of testing a centrifugal pump, comprising:
   a. Moving a test system near to a pump to be tested;
   b. Connecting a test system's water tank to the intake port of a pump to be tested through a suction line;
   c. Connecting a discharge line from the discharge port of the pump to a discharge port on test system water tank which is constructed so the water flows from the discharge line into the water tank at below the surface of the water in the tank already;
   d. Adjusting a first test system valve so it restricts water flow to the pump to simulate NFPA 1911 test conditions or other desired intake load;
   e. Adjusting a second test system valve so it restricts water flow from the pump to simulate back pressure operational conditions;
   f. Priming all aforementioned plumbing, so the test system and pump contains water;
   g. Begin test procedures as described in NFPA 1911 or other desired tests;
   h. Monitor fluid flow and temperature using flow meters in each water path, including the intake path from tank to pump, and the discharge path from pump to tank;

i. Using communications and control software, instruct the valves to change position to reflect desired load and flow parameters during testing;
j. Displaying the operational parameters on a monitor in real time during the test; and
k. Saving the operational parameters and performance in a computer for later evaluation and maintenance record-keeping.

13. A method of testing a centrifugal pump as in claim 12, further comprising:
l. optionally adjusting the valves in real-time to more precisely reflect desired testing parameters based on vacuum gages and flow readings during testing.

* * * * *